(12) United States Patent  
Garrison

(10) Patent No.: US 7,983,924 B2  
(45) Date of Patent: Jul. 19, 2011

(54) SYSTEM AND METHOD FOR THIRD PARTY CUSTOM OFFERINGS OF ELECTRONIC CARDS

(75) Inventor: Edward K. Garrison, Lake Bluff, IL (US)

(73) Assignee: Edward K. Garrison, Lake Bluff, IL (US)

( * ) Notice: Subject to any disclaimer, the term of this patent is extended or adjusted under 35 U.S.C. 154(b) by 676 days.

(21) Appl. No.: 11/483,838

(22) Filed: Jul. 10, 2006

(65) Prior Publication Data

US 2007/0050203 A1    Mar. 1, 2007

Related U.S. Application Data

(60) Provisional application No. 60/698,462, filed on Jul. 8, 2005.

(51) Int. Cl.
```
G06Q 10/00        (2006.01)
G06F 15/16        (2006.01)
G06F 17/00        (2006.01)
```
(52) U.S. Cl. ......... 705/1.1; 709/203; 709/206; 709/217; 709/246; 709/232; 705/329; 705/26.1

(58) Field of Classification Search ........................ None
See application file for complete search history.

(56) References Cited

U.S. PATENT DOCUMENTS

| 5,513,117 | A* | 4/1996 | Small ............................. 700/233 |
| 5,748,484 | A* | 5/1998 | Cannon et al. ................. 700/233 |
| 5,960,412 | A* | 9/1999 | Tackbary et al. ............... 705/27 |
| 6,092,054 | A* | 7/2000 | Tackbary et al. ............... 705/27 |
| 6,965,912 | B2* | 11/2005 | Friedman et al. ............. 709/203 |
| 7,512,552 | B2* | 3/2009 | Karas et al. ..................... 705/26 |
| 2003/0177067 | A1* | 9/2003 | Cowell et al. ................... 705/14 |
| 2003/0233422 | A1* | 12/2003 | Csaszar et al. ................ 709/206 |
| 2004/0254859 | A1* | 12/2004 | Aslanian, Jr. ................... 705/27 |

OTHER PUBLICATIONS

Snap shot images from wayback machine attached as egreetings_1 and 2.*

* cited by examiner

*Primary Examiner* — Matthew L Brooks

(74) *Attorney, Agent, or Firm* — Peter K. Trzyna, Esq.

(57) ABSTRACT

Apparatus (method implemented with a machine, the machine, and the method for making the machine, and products produced thereby). The computer system can, for example, be structured (e.g., including programmed) to carry a method including: controlling, with at least one application computer program, a server system to create, and to maintain, multiple sites on a wide area network, each said site providing electronic greeting cards, each said site corresponding to an independent party.

20 Claims, 11 Drawing Sheets

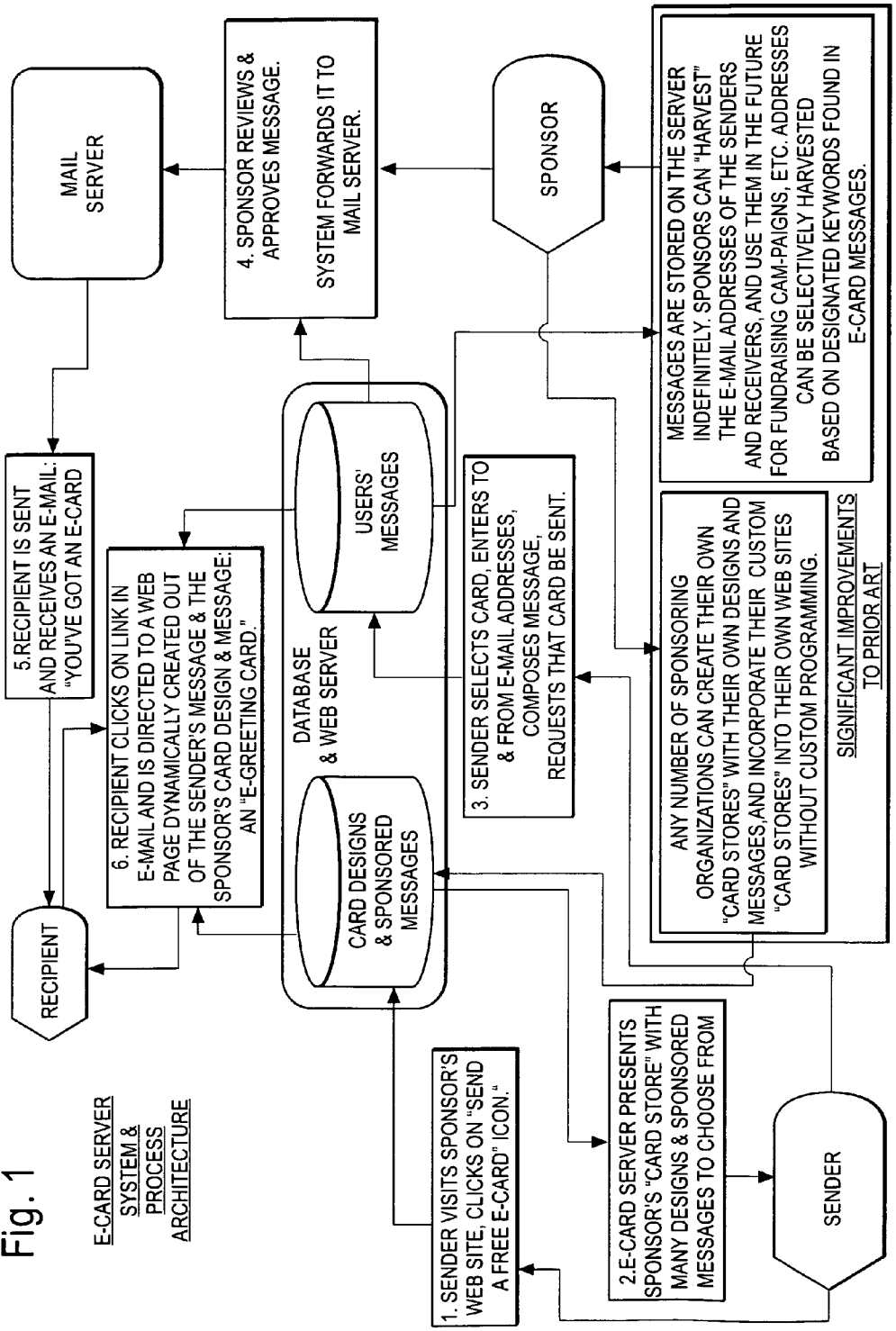

Fig. 2

PLACES TO GO

HOME (L.A.T.E. BREAKING NEWS)
CONTACT US
2006 T-SHIRT DESIGN CONTEST

RIDE INFORMATION
  >>GENERAL INFORMATION
  >>FREQUENTLY ASKED QUESTIONS
  >>NIGHT OF THE RIDE BAND
  >>ROUTE DETAILS

REGISTRATION
  >>REGISTER NOW!
  >>REGISTRATION INFO
  >>PACKET PICK-UPS

VOLUNTEER INFORMATION
  >>VOLUNTEER OPPORTUNITIES
  >>VOLUNTEER MEETINGS & PARTIES
  >>STORIES FROM VOLUNTEERS

PHOTOS & STORIES
  >>PHOTO GALLERIES
  >>T-SHIRT DESIGN GALLERY
  >>SPECIAL PARTICIPANT PROFILES
  >>PARTICIPANT QUOTES

SAFETY, GEAR & SUPPORT
  >>SAFETY TIPS

TRANSPORTATION & PARKING
  >>PARKING
  >>PUBLIC TRANSPORTATION
  >>LOCAL ACCOMODATIONS
  >>EXPLORING CHICAGO

SPONSORSHIP
  >>OUR SPONSORS
  >>FOOD & BEVERAGES
  >>BECOME A SPONSOR

ABOUT THE RIDE
  >>ABOUT FRIENDS OF THE PARKS
  >>LETTER FROM THE RIDE DIRECTOR
  >>BIKE RIDES, CLUBS AND EVENTS

---

NEW!
SEND A FREE E-CARD TO YOUR FRIENDS

YOU ALREADY KNOW WHAT FUN THE L.A.T.E. RIDE IS.
USE OUR FREE ECARDSERVER™ TO TELL A FRIEND ABOUT IT.
IT'S EASY AND FUN. JUST CLICK HERE.

Send a Free E-Card!
*E-Card Server ™ brought to you by Friends of the Parks' L.A.T.E. Ride*

IT'S EASY--AND FUN--TO SEND AN E-CARD. FIRST, CLICK ON ANY OF THE CARDS SHOWN BELOW. YOU'LL BE ABLE TO PREVIEW IT. ONCE YOU'VE CHOSEN ONE, YOU'LL BE ABLE TO INPUT THE RECIPIENT AND YOUR MESSAGE...

*Send a Free E-Card!*
*E-Card Server    brought to you by Friends of the Parks' L.A.T.E. Ride*

- 
- 
- 
- YOUR PERSONAL MESSAGE WILL APPEAR HERE.
- 
- 
-

[SPONSORED MESSAGE FROM FRIENDS OF THE PARKS]
ENJOY THE MAGIC OF A LAKE MICHIGAN SUNRISE... IT'S ALL PART OF THE L.A.T.E. RIDE!

<<PREVIOUS CARD    RETURN TO OVERVIEW OF CARDS    NEXT CARD>>

\>\>SELECT THIS CARD TO SEND!<<

Fig. 5

*Send a Free E-Card!*
*E-Card Server    brought to you by Friends of the Parks' L.A.T.E. Ride*

YOU'RE ALMOST DONE!

JUST ENTER THE INFORMATION BELOW, AND CLICK EITHER "PREVIEW" TO PREVIEW WHAT YOU'VE DONE OR "SEND" TO SEND THE CARD. YOU CAN ALSO GO BACK TO THE OVERVIEW, AND START ALL OVER AGAIN IF YOU WISH

YOU'RE NAME*:

YOU'RE E-MAIL ADDRESS*:

RECIPIENT NAME*:          EMAIL*:
ADD'L RECIPIENT*:         EMAIL*:
ADD'L RECIPIENT*:         EMAIL*:
ADD'L RECIPIENT*:         EMAIL*:
ADD'L RECIPIENT*:         EMAIL*:

MESSAGE*:

RETURN TO OVERVIEW OF CARDS     PREVIEW CARD     SEND CARD

Fig. 6

*Send a Free E-Card!*
*E-Card Server    brought to you by Friends of the Parks' L.A.T.E. Ride*

YOU'RE ALMOST DONE!

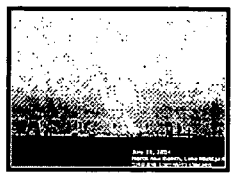

JUST ENTER THE INFORMATION BELOW, AND CLICK EITHER "PREVIEW" TO PREVIEW WHAT YOU'VE DONE OR "SEND" TO SEND THE CARD. YOU CAN ALSO GO BACK TO THE OVERVIEW, AND START ALL OVER AGAIN IF YOU WISH

YOU'RE NAME*: | PETER TRYZNA

YOU'RE E-MAIL ADDRESS*: | P       @MSN.COM

| | | | |
|---|---|---|---|
| RECIPIENT NAME*: | PETER TRYZNA | EMAIL*: | P       @AOL.COM |
| ADD'L RECIPIENT*: | | EMAIL*: | |
| ADD'L RECIPIENT*: | | EMAIL*: | |
| ADD'L RECIPIENT*: | | EMAIL*: | |
| ADD'L RECIPIENT*: | | EMAIL*: | |

MESSAGE*: | TEST MESSAGE EXAMPLE FOR A PATENT APPLICATION

RETURN TO OVERVIEW OF CARDS      PREVIEW CARD      SEND CARD

*Here's a preview of your E-Card*
Brought to you courtesy of Friends of the Parks' L.A.T.E. Ride

TO: PETER TRYZNA <P    @AOL.COM>

FROM: PETER TRYZNA <P    @MSN.COM>

TEXT MESSAGE EXAMPLE FOR A PATENT APPLICATION

[SPONSORED MESSAGE FROM FRIENDS OF THE PARKS]
ENJOY THE MAGIC OF A LAKE MICHIGAN SUNRISE... IT'S ALL PART OF THE L.A.T.E. RIDE!

SEND CARD

RETURN TO EDIT / CANCEL

Fig. 8
Send a Free E-Card!
E-Card Server ™ brought to you by Friends of the Parks' L.A.T.E. Ride
SUCCESS! YOUR E-CARD WILL AUTOMATICALLY BE UPLOADED TO THE WEB, AND WILL NORMALLY BE E-MAILED TO THE RECIPIENT WITHIN 24 HOURS.
WANT TO SEND ANOTHER? GO AHEAD--IT'S FREE!
| 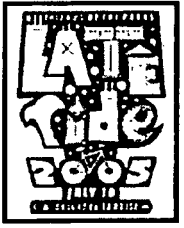 ALL THIS AND A T-SHIRT TOO! |  8,000 CYCLISTS CAN'T BE WRONG! |  A MAGICAL SUNRISE | 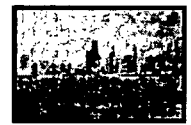 A CHICAGO DAWN-BY BIKE! |
|---|---|---|---|

Fig. 9

PETER K. TRZYNA

FROM: S    @ECARDSERVER.NET

SENT: FRIDAY, JUNE 30, 2006 10:31 AM

TO: P    @MSN.COM

SUBJECT: YOUR E-CARD(S) HAVE BEEN E-MAILED

THE E-CARD YOU RECENTLY ENTERED ON THE WEB HAS BEEN SENT.

TO VIEW YOUR E-CARD, CHOOSE FROM THE FOLLOWING OPTIONS:

CLICK ON THE FOLLOWING LINK:
HTTP://    ECARDSERVER.NET/DISPLAYCARD.ASP?CARDID=41909458191

OR COPY AND PASTE THE ABOVE LINK INTO YOUR WEB BROWSER'S "ADDRESS" WINDOW.

OR ENTER THE FOLLOWING ECARD NUMBER, 41909458191, AT OUR CARD PICK UP WINDOW AT
HTTP://    ECARDSERVER.NET.

YOUR E-CARD WAS SENT COURTESY OF FRIENDS OF THE PARKS' L.A.T.E. RIDE (  LATERIDE.ORG).

Fig. 10

SUBJ: HELLO, PETER TRZYNA AS SENT YOU AN E-CARD
DATE: 6/30/2006 10:31:01 A.M. CENTRAL STANDARD TIME
FROM: P    @MSN.COM
TO: P    @AOL.COM

GREETINGS, PETER TRZYNA–

TO VIEW YOUR E-CARD, CHOOSE FROM THE FOLLOWING OPTIONS:

CLICK ON THE FOLLOWING LINK:
HTTP://   ECARDSERVER.NET/DISPLAYCARD.ASP?CARDID=41899458191

OR

COPY AND PASTE THE ABOVE LINK INTO YOUR WEB BROWSER'S "ADDRESS" WINDOW.

OR

ENTER THE FOLLOWING ECARD NUMBER, 41899458191, AT OUR CARD PICK UP WINDOW AT
HTTP://   ECARDSERVER.NET.

YOUR E-CARD WAS SENT COURTESY OF FRIENDS OF THE PARKS' L.A.T.E. RIDE (   LATERIDE.ORG).

*Here's your E-Card*
*Brought to you courtesy of Friends of the Parks' L.A.T.E. Ride*

TO: PETER TRYZNA <P    @AOL.COM>

FROM: PETER TRYZNA <P    @MSN.COM>

TEST MESSAGE EXAMPLE FOR A PATENT APPLICATION

*[SPONSORED MESSAGE FROM FRIENDS OF THE PARKS]*
*ENJOY THE MAGIC OF A LAKE MICHIGAN SUNRISE... IT'S ALL PART OF THE L.A.T.E. RIDE!*

CLICK HERE TO SEND YOUR OWN E-CARD. IT'S EASY -- AND FUN!

SYSTEM AND METHOD FOR THIRD PARTY CUSTOM OFFERINGS OF ELECTRONIC CARDS

The present patent application claims benefit from, and incorporates by reference, U.S. Patent Application No. 60/698,462, titled "E-Card Server" filed Jul. 8, 2005, naming the same inventor.

COMPUTER CODE APPENDIX

A portion of the disclosure of this patent document contains material that is subject to copyright protection. The copyright owner has no objection to a statutory fair use of this material, as it appears in the files of the files or records of the U.S. Patent and Trademark Office, but otherwise reserves all copyright rights whatsoever. Computer code (as an appendix incorporated herein) is provided on the enclosed two (2) CD-ROM discs. Each disc contains the same information as the other.

TECHNICAL FIELD

The technical field is computers and data processing systems. Depending on the implementation, there is apparatus, a method for use and method for making, and corresponding products produced thereby, as well as data structures, computer-readable media tangibly embodying program instructions, manufactures, and necessary intermediates of the foregoing, each pertaining to digital aspects of wide area network communications.

BACKGROUND ART

Illustratively, there have been electronic communications over wide area networks such as the Internet and world wide web communications, as exemplified by Blue Mountain Greeting Cards. However, so far as is presently known, that which is set forth below offers a further development that can be carried out in different ways.

BRIEF DESCRIPTION OF THE DRAWINGS

FIG. 1 illustrates an overview of an embodiment.
FIG. 2 illustrates a screen of an embodiment.
FIG. 5 illustrates a screen of an embodiment.
FIG. 6 illustrates a screen of an embodiment.
FIG. 8 illustrates a screen of an embodiment.
FIG. 9 illustrates an email of an embodiment.
FIG. 10 illustrates an email of an embodiment.

MODES

Figure 3:
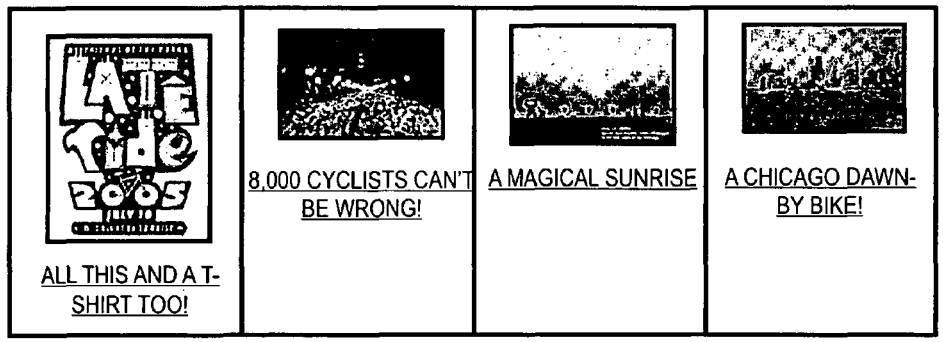
FIG. 3 illustrates a screen of an embodiment.

The accompanying drawings illustrate embodiments intended to illustrate and exemplify in a teaching manner.

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow or "logic means" can be implemented in discrete circuits, programmed computer, or the equivalent. Computer-readable media, as used herein can comprise at least one of a RAM, a ROM, A disk, an ASIC, and a PROM. Industrial or technical applicability is clear from the description, and is also indicated below.

By way of the following prophetic teaching, there can be computer support, as in a data processing system, for implementing a server system that is program controlled. The server system can facilitate any positive number of organizations to design, manage, and provide electronic greeting card services to individuals who log on to the organizations' Web sites. If desired, the greeting cards sent through an organization's web site can be "moderated," i.e., checked for inappropriate content. Further, the system can enable the organization using the system to "mine" the greeting card data to obtain valuable marketing information.

Attention is drawn to the representative embodiment in FIG. 1, but note another embodiment is provided with code in the appendix. FIG. 1 shows a sender 2 can go, for example by way of the world wide web, to visit a sponsor's site 4 and can click a button on the sponsor's site screen 4 to send an e-card (or otherwise send something, such as a gift or order of goods or services). The sponsor's site 4 can make use of card designs and sponsored messages 6 in a database and web server 8. The database and web server 8 presents a sponsor's card store screen 10 to the sender 2.

The sender then selects, on a screen 12, a card or the like, enters the "to" and "from" email addresses, composes a message, and requests that the card be sent. User's messages and other information (depending on preferences in any given application) can be stored in memory 14 at the database and web server 8. Note that the user's messages can be stored indefinitely to allow respective sponsors 22 to harvest email addresses of senders 2 and recipients 22. Keyword searching of addresses and messages can also be provided. Note too that any number of sponsors 22 can have their own e-card stores (or the like), without custom programming for each store or for each of the sponsors 22 organizations.

Returning to the logic flow of FIG. 1, there can be a sponsor review 24 (human or automated) to avoid inappropriate content, and approved messages and e-card information are sent to an email server 26 for subsequent transmission over a network such as a WAN (that can be any combination of packet-switched, circuit switched, and/or cellular).

A notice message 28 is communicated from the email server 26 to indicate to the recipient 22 "you've got an e-card", and a link is provided in the notice message 28 to obtain the card. The recipient 22 uses the link (e.g., clicks on a hyperlink) in the email and is directed to a web page dynamically created out of the particular message of the sender 2 and the card of the sponsor 20, to form a combination received by the recipient 22.

The sender 2 and recipient 22 each pertain to a respective computer system that can comprise a computer (e.g., an IBM, Hewlett Packard, other personal computer or computing element), such as with a microprocessor (e.g., an Intel series processor or the like), a memory system (such as a hard drive, disk drive, etc.), an input device (e.g., keyboard, mouse, modem, or the like), and one or more output devices (e.g., a Hewlett Packard printer, a Dell monitor, a modem, or other such output device). The computer system can include (i) an operating system such as Microsoft XP Professional and optional applications. Sponsor 20 can be much the same, or can be a web server or other computer capable of carrying out the sponsor functions indicated herein.

In another embodiment, in a system such as that in FIG. 1, note that all components can be scaled, e.g., a sender 2 is illustrative of a plurality of senders, just like a server can be distributed into a plurality, there can be computer software or a program that is installed to cooperate with a database for a web server. A "generic" SMTP mail server is exemplary. However, in another embodiment, the Database and Web Server 8 are on only one computer that handles the multiple web sites.

The web server system can comprise:

1) A data base including:
   A table of organizations using the system. The table includes each organization's name, its home page address, and other relevant data.
   Images, that can be used as "electronic greeting cards."
   Texts of "sponsored messages" from the organizations that will be included with the electronic greeting cards.
   Information regarding each greeting card sent: the sender's name and e-mail address, the recipient(s) name(s) and e-mail address(es), the text of the sender's greeting card message, the organization sponsoring the message, the image to be used, and the sponsored message from the organization.
   Data regarding the status of the message (sent, rejected, and so on).

2) Computer program(s) which interact with the database, and/or accept or transfer data to web (HTML) pages.
   These programs can provide such functionality as:
   Display any given organization's images and messages in the form of an "electronic card store" to Web users.
   Allow users to input sender's name and address, recipient(s) name(s) and e-mail address(es), and the text of the greeting card message.
   Allow the sponsoring organization to review messages for appropriateness before processing them further.
   Send an e-mail to the recipient(s) that a greeting card has been sent. The e-mail includes a link that allows the recipient to "retrieve" the card in the form of a Web page.
   Serve up the greeting card to the recipient in the form of a Web page.
   Allow a sponsoring organization to easily upload images and texts in order to create its own individualized "electronic card store."
   Archive all messages sent, and allow the sponsoring organization to "harvest" the names and e-mail addresses of all senders and recipients. Either all addresses can be harvested, or only those linked to messages with specific key words in the message texts. For example, if a nature conservation organization used the system, it may wish to harvest only the addresses of those who sent or received messages containing the term "wetlands." These addresses could then be used for a targeted marketing program aimed at those wishing to conserve wetlands.

An embodiment can allow users to create an unlimited number of seemingly independent "electronic greeting card stores," each of which serves the specific needs of a different organization, and each of which displays its own repertoire of cards, messages, and themes. For example, one "store" could serve the needs of the American Red Cross, and would contain disaster-relief themed cards and messages; another could serve the SPCA, and would contain animal-protection cards and messages, and so on. If it were later desired to create a "store" for the Nature Conservancy involving nature-themed cards and messages, this could be accomplished without any additional custom computer programming.

An embodiment can allow each of the many independent "greeting card stores" to "mine" the stored sender, recipient, and message information for (1) e-mail addresses of individuals who have used the "store," and therefore can be assumed to be sympathetic to the goals of the individual organization, (2) message contents which give clues to the concerns and interests of those visiting the "greeting card store," and (3) statistics regarding the usage of the "store," which gives insight into its effectiveness. Unless specifically permitted by the system administrator, each "store" has access only to its own data and not that of the other "stores."

In another articulation, there can be four kinds of parties are involved in the use of an embodiment herein:

1) The "provider" (of Database and web server 8) installs the software on its computer hardware. It is typically a provider of Web services such as hosting and networking, but does not have to be.

2) The "sponsor" 20 is the organization providing greeting card services through its Web site. The sponsor's Web site need not be hosted on the same hardware as the providers, though it can be. The sponsor places an icon or text link on its Web site, which, when clicked, links to the software on the provider's hardware. For illustrative purposes, assume that the sponsor is a nature conservation organization, although it could be any organization that wishes to encourage its members and friends to help spread its message.

3) The "sender" 2 is anyone who logs onto the sponsor's Web site and chooses to send a greeting card.

4) The "recipient" 22 is the person chosen by the sender 2 to receive the sender's electronic greeting.

The sender 22 is typically a visitor to the sponsor's 20 Web site where, for example, information can be provided about a sponsor 22, as illustrated in FIG. 2. On the sponsor's Web site, the sender 22 will see an icon or link with an inscription such as "click her to send a free e-card."

Upon clicking the icon, the sender 22 is directed to the sponsor's "greeting card store," i.e. a selection of greeting cards, each of which comprise an image (analogous to the picture on a picture on a picture postcard) or graphic or animation or sound or combination thereof. In one example, the cards can show nature themes, and the sponsored messages can encourage conservation. See, for example, FIG. 3.

Figure 4:
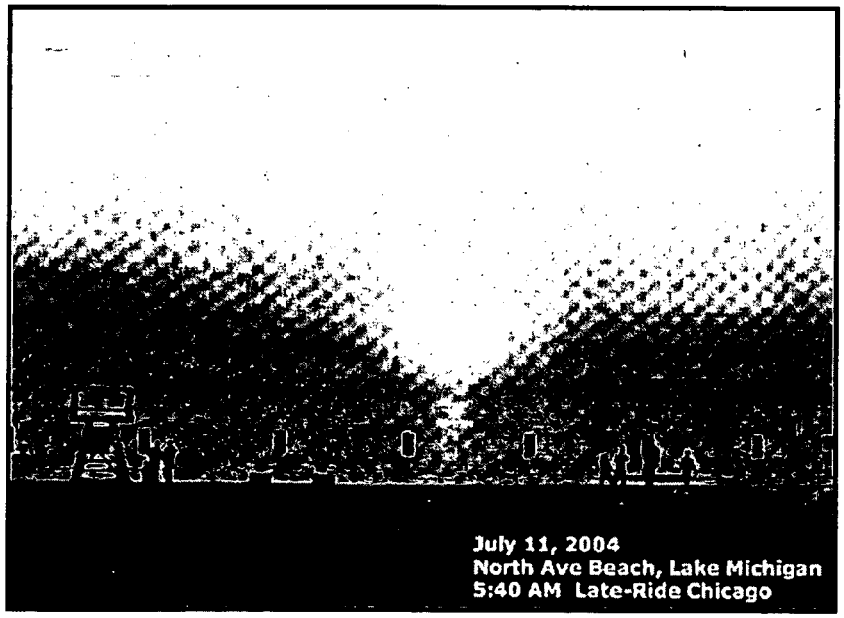
FIG. 4 illustrates a screen of an embodiment.
Figure 7:
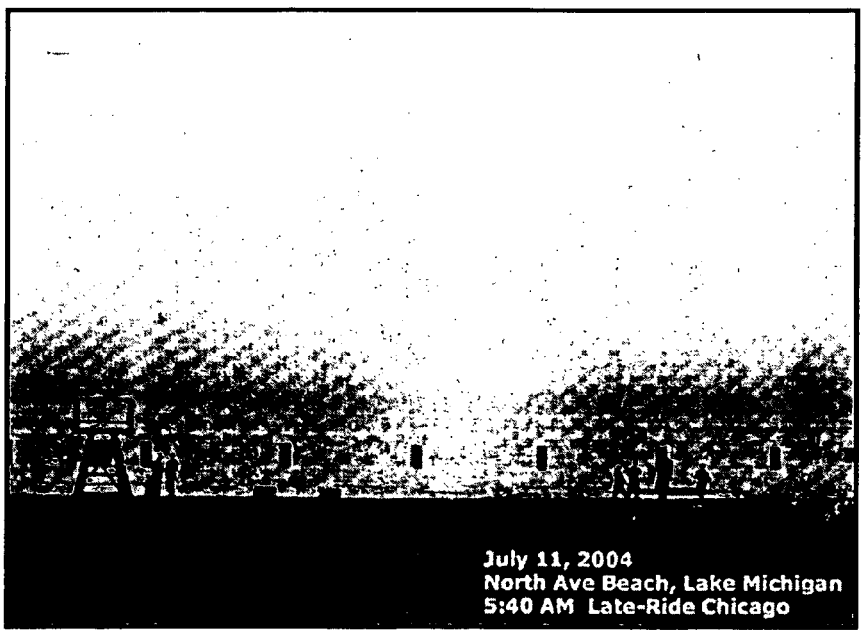
FIG. 7 illustrates a screen of an embodiment.

Upon selecting a greeting card, (See, for example, FIG. 4) the sender 2 is prompted to enter his or her name and e-mail address, the names(s) and e-mail address(es) of the person(s) to whom he or she wishes to send the card, and the text of the greeting which the sender 2 wishes to send to the recipient(s) 22. See, for example, FIGS. 5-6. This text is analogous to the handwritten text written on a picture postcard in addition to any pre-printed text. The information and card are assembled into a preview, as illustrated in FIG. 7.

Once the sender 2 enters this information, he/she receives a message that the "card" will soon be forwarded to the recipient 22. See, for example FIG. 8 and FIG. 9.

On an ongoing basis, a list of all cards entered in this manner is available for review by the sponsor 20. The sponsor 20 can either review the cards for appropriate content, or can direct the system to automatically forward all cards entered. The latter option, of course, involves less work for the sponsor. With the former option (which is known as "moderating" the messages), however, it is possible for the sponsor 20 to prevent its "card store" being used for inappropriate purposes, e.g. to send obscene messages.

Once a message has been approved (or if the sponsor 20 chooses not to moderate messages), the mail server 26 sends an e-mail to the recipients(s) 22 informing him/her/them that an electronic greeting card is waiting for "pickup." The e-mail contains a hyperlink to the provider's server 8 with appropriate data that will enable the server 8 to serve up the proper e-card. See, for example, FIG. 10.

Figure 11:
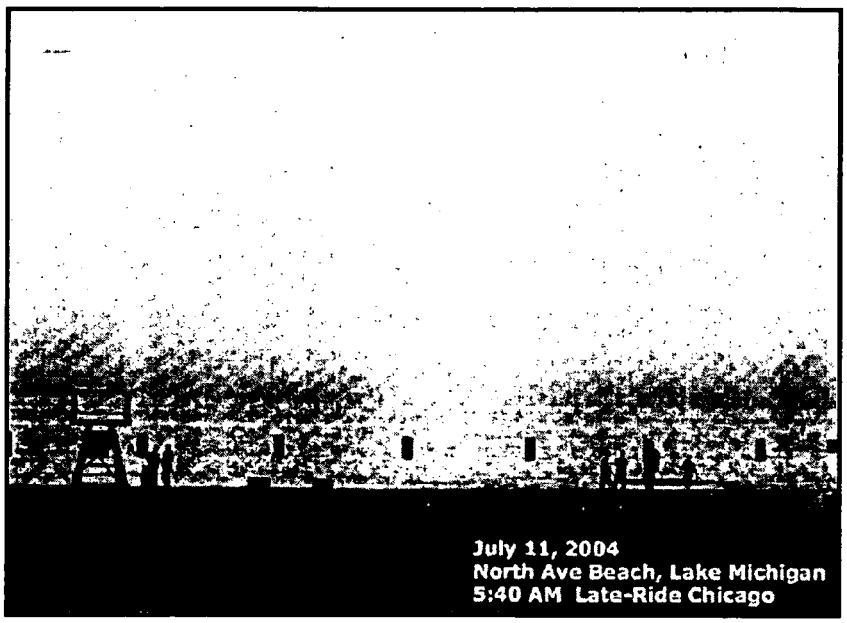
FIG. 11 illustrates a communication of an embodiment.

When the recipient 22 clicks on the link, the electronic greeting, comprising (1) an image, (2) the greeting message written by the sender 2, and (3) the sponsored message from the sponsor 20, appears in the recipient's 2 browser in the form of a Web page. See, for example, FIG. 11.

From the viewpoint of the sender 2 and the recipient 22, they will perceive the "card store" as a service of the sponsor 20 (since the Web pages are accessed through the sponsor's 20 Web site and contain the sponsor's 20 themes) rather than as a server of the provider of database and web server 8.

Several additional features are noteworthy. Depending on the preferred embodiment for one application or another, an embodiment can allows any number of organizations—the "sponsors" 20—to create their own "card stores" by uploading the appropriate images and sponsored messages to the server 8. This is done through easy to use Web pages and does not require the sponsors 20 to engage in any programming, nor to possess any special hardware or software other than a Web browser and an Internet connection.

Each sponsor's 20 collection of greeting cards created in this manner is kept separate from other sponsors' 20 connections, and is presented to senders 2 in such a way as to appear to be a service of the particular sponsor 20 of interest.

Thus, for example, an organization such as the Nature Conservancy could, by using e-card server, easily offer a collection of nature-themed greeting cards that would be available by a link on its home page. The Red Cross could offer disaster-relief-themed cards, and so on. These organizations would both encourage repeat visits to their sites by providing greeting card services, and would be able to spread their respective messages by placing them on the cards they design and provide.

Like commonly available picture post cards, which contain a pre-printed image and a pre-printed brief message, yet allow the purchaser to add his or her own address and message to those pre-printed, each electronic greeting card in an embodiment herein can contain an image and a message, e.g. a picture of a disaster zone, and a message thematic with the picture or image and/or sponsor, such as: "Please Contribute to the Red Cross and Help Us Help Those in Need." A user can add a "from" and at least one "to" e-mail address. The user may also add their own additional personal message if so desired. The system can thus promote the message of the sponsoring organization while at the same time allowing the user to add his or her own personal message.

Also, server 8 archives the e-mail addresses of all senders and recipients, as well as the cards chosen and the messages written in a relational database. This enables the particular sponsor 20, or the provider of server 8, to collect e-mail address for marketing and data mining purposes. Moreover, the addresses can be collected in a targeted manner based upon the content of the e-mails. For example, the Nature Conservancy could obtain a list of the e-mail addresses of all those who sent, or who received, messages containing the term "wetlands." This would be accomplished by logging on to a special, password-protected Web page, and entering the appropriate keywords. The server 8 then serves up a list of e-mail addresses in CSV or another universally readable format.

Communications, such as from the sponsor 20 to the web server 8 can require authorization and can be encrypted. Password protection for the sponsors 20 can be configured to enable a particular one of the sponsors 20 to do data mining and harvest sender, receiver, and/or message information for only those sending cards from the site of that particular one of the sponsors 20.

From a different embodiment view, there can be a computer-readable media tangibly embodying a program of instructions executable by a computer to enable, depending on the particular application desired, one or more of the following:
(1) creating multiple seemingly independent "card stores" with different cards and themes;
(2) independently setting up, managing, and operating the "stores" without necessarily having custom computer programming; and/or
(3) for each "store" operator, independently facilitating mining the sender/receiver e-mail addresses and the contents of the messages.

The media can comprise at least one of a RAM, a ROM, a disk, an ASIC, and a PROM, or otherwise, as one may prefer. Illustratively for teaching purposes, but not so as to limit, attention is again drawn to the code in the appendix.

In yet another way of thinking, there can be an apparatus for arranged for controlling a system carrying out an implementation of any of the plurality of embodiments mentioned herein. For example, there can be an apparatus (method of making and/or using such an apparatus) including any of: means for creating multiple seemingly independent "card stores" with different cards and themes; means for independently setting up, managing, and operating the "stores" without necessarily having custom computer programming; and/or for each "store" operator, means for independently facilitating mining the sender/receiver e-mail addresses and the contents of the messages. Such means for can also exist for the components of such a system, including the sponsor 22, recipient 22, and sender 2.

Yet a further set of embodiments can be in a user interface, that preferably is graphical, structured to elicit information to carry out an embodiment herein, e.g., so as to enable the functionality embraced by the scope herein indicated. Illustratively, but not so as to limit the functionality, attention is drawn to FIGS. 2-8.

Yet a still further set of embodiments can be in viewing each computer cooperating in the system as an electronic transmission apparatus communicating with an electronic receiver apparatus. In this regard, there can be pre-stored communications that are customized (according to input of a sender 2) in order to carry out the functionality embraced herein. For example, in connection with a representative method of communicating, the method can include: initiating communication between a sponsor 20 computer system and a web server system (such as, but not limited to) system 8 that provides electronic greeting card web sites to respective parties; creating a plurality of electronic greeting cards; making the electronic greeting cards available at a particular one of the web sites; providing the web sites by the server system; and wherein the creating, making, and providing are carried out without custom programming for the particular one of the sites. Illustratively, but not so as to limit the functionality, attention is drawn to FIGS. 9-11. Note that the images in FIG. 11 and in FIGS. 3-8 are equally illustrative and not intended to be limiting.

In sum, appreciation is requested for the range of possibilities flowing from the core teaching herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments are as described and suggested herein. Although the disclosure herein has been described with reference to specific embodiments, the disclosures are intended to be illustrative and are not intended to be limiting. Various modifications and applications may occur to those skilled in the art without departing from the true spirit and scope defined in the appended claims.

Thus, although only a few exemplary embodiments have been described in detail above, those skilled in the art will readily appreciate that many modifications are possible in the exemplary embodiments without materially departing from the novel teachings and advantages herein. Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

I claim:

1. A method of using a web server, the method including: providing a web server system which is programmed to allow each of a plurality of parties to independently design and create electronic greeting cards to offer in a collection via a web site of the respective party;
storing, via the web server system, independently created collections of the independently designed and created electronic greeting cards of each of the parties;
allowing, via the web server system, electronic communication from each of the web sites to the respective stored collection of greeting cards to permit display of the greeting cards in the respective stored collection;
allowing access, by a sender visiting one of the web sites, to one of the collections so as to appear as if the one of the collections is offered by the one of the web sites;
allowing, via the web server system, the sender to select and further customize one of the electronic greeting cards in the one of the collections so as to form an electronic greeting card to be sent; and
allowing, via the web server system, the sender to electronically send the electronic greeting card to a recipient, so as to appear to the recipient that the electronic greeting card comes from the sender and from the one of the web sites.

2. The method of claim 1, wherein the web server system, separately for each said collection, stores sender information, recipient information, and message information for each electronic greeting card sent via use of a hyperlink.

3. The method of claim 2, wherein the web server system, separately for each said collection, enables a keyword search capability for searching the information corresponding to the respective collection.

4. The method of claim 1, wherein the web server system assigns a respective hyperlink to each of the web sites to enable access to the respective collections from the respective one of the web sites.

5. The method of claim 4, wherein the web server system enables a respective one of the plurality of parties to mine usage data of corresponding to a respective one of the collections.

6. An apparatus including:
a web server system programmed to carry out the operations of:
allowing each one of a plurality of parties to independently design and create electronic greeting cards to offer in a collection of said independently designed and created electronic greeting cards via a web site corresponding to the one of the parties;
storing the collections of said independently designed and created electronic greeting cards;
allowing electronic communication from each of the web sites to the respective stored collection of greeting cards to permit display of the greeting cards in the respective stored collection;
allowing access, by a computer of a sender visiting one of the web sites, to one of the collections so as to appear as if the one of the collections is offered by the one of the web sites;
allowing the sender to select and further customize one of the electronic greeting cards in the accessed one of the collections so as to form an electronic greeting card to be sent; and
allowing the sender to electronically send the electronic greeting card to a computer of a recipient, so as to appear to the recipient that the electronic greeting card comes from the sender and from the one of the web sites.

7. The apparatus of claim 6, wherein each of said collections has associated data accessible by a respective access control and separately from data associated with other said collections.

8. The apparatus of claim 6, wherein the web server is programmed to associate each said collection with corresponding usage data separate from usage data of other said collections and made accessible by the web server separately from usage data of other said collections by the respective access control.

9. The apparatus of claim 8, wherein said corresponding usage data comprises an identity of each electronic greeting card sender, and an identity of each electronic greeting card receiver.

10. The apparatus of claim 9, wherein said corresponding usage data comprises each message sent by each said sender, an access date of each said respective senders, and an access date of each said receiver.

11. The apparatus of any one of claims 7-10, further including a plurality of sponsor computers, each of said sponsor computers corresponding to one of said collections and allowed by the respective access control to access the corresponding usage data so as to facilitate mining the respective usage data.

12. The apparatus of claim 6, further including a plurality of sponsor computers, each of said sponsor computers corresponding to one of said collections and allowed by the respective access control to modify the respective collection.

13. The apparatus of any one of claims 6-10, further including a plurality of sponsor computers, each of said sponsor computers corresponding to one of said collections and displaying the respective hyperlink on a respective web site.

14. The apparatus of claim 13, further including a plurality of user computers, each of said user computers in communication with the web server by implementing a respective one of said respective hyperlink on one said web site so as to view an electronic greeting card of the collections.

15. Apparatus providing separate collections of electronic greeting cards, the apparatus including:

a web server in communication with computers of each of a plurality of parties, with sender computers, and with receiver computers, the web server is programmed to allow each of the plurality of parties via the respective party's computer to independently design and create electronic greeting cards to offer in a collection via a web site corresponding to the respective party;

the web server storing independently created collections of the independently designed and created electronic greeting cards of each of the parties;

the web server is programmed to allow electronic communication electronic communication from each of the web sites to the respective stored collection of greeting cards to permit display of the greeting cards in the respective stored collection;

the web server is programmed to allow the sender computers, corresponding to respective senders, access to the collections so as to appear as if each accessed collection is offered by the corresponding one of the web sites; and the web server is programmed to allow each one of the senders, via a corresponding one of the sender computers, to select and further customize one of the electronic greeting cards in the accessed one of the collections so as to form an electronic greeting card to be sent and to initiate electronically sending the electronic greeting card to one of the computers corresponding to one of the recipients, so as to appear to the corresponding recipient that the electronic greeting card comes from the sender and from the corresponding one of the web sites.

16. The apparatus of claim 15, wherein each said collection is associated with collection usage data separate from collection usage data of other said collections and is accessible via the web server separately from collection usage data of other said collections by an access control corresponding to the collection, and the respective usage data comprises some of: an identity of each electronic greeting card sender, an identity of each electronic greeting card receiver, each message sent by each said sender, an access date of each said respective senders, and an access date of each said receiver.

17. The apparatus of claim 16, wherein each of the collections corresponds to a hyperlink, and communication by the senders computers to the collections is via one of the hyperlinks.

18. The apparatus of claim 16, wherein the web server assigns a respective hyperlink to each of the web sites, and whereby the assigned hyperlinks enable the sender computers to access to the collections.

19. The apparatus of claim 16, wherein the web server allows each of the parties to carry out data mining of the corresponding collection usage data.

20. The apparatus of claim 16, wherein the web server allows each of the parties to carry out computerized keyword search data mining of the corresponding collection usage data.

* * * * *